United States Patent
Weston et al.

(10) Patent No.: US 10,713,693 B2
(45) Date of Patent: Jul. 14, 2020

(54) METHOD AND APPARATUS FOR ADVERTISING CONTENT MANAGEMENT

(71) Applicant: DEVNET, INC., Raleigh, NC (US)

(72) Inventors: Ian Weston, York (GB); Timothy John Ocock, London (GB)

(73) Assignee: DEVNET, INC., Raleigh, NC (US)

( * ) Notice: Subject to any disclaimer, the term of this patent is extended or adjusted under 35 U.S.C. 154(b) by 834 days.

(21) Appl. No.: 15/067,336

(22) Filed: Mar. 11, 2016

(65) Prior Publication Data

US 2017/0262902 A1  Sep. 14, 2017

(51) Int. Cl.
  *G06Q 30/00*  (2012.01)
  *G06Q 30/02*  (2012.01)
(52) U.S. Cl.
  CPC ............................. *G06Q 30/0277* (2013.01)
(58) Field of Classification Search
  None
  See application file for complete search history.

(56) References Cited

U.S. PATENT DOCUMENTS

| | | | |
|---|---|---|---|
| 7,099,870 B2 | 8/2006 | Hsu et al. | |
| 7,266,832 B2 * | 9/2007 | Miller | H04H 20/10 348/E5.007 |
| 8,812,363 B2 | 8/2014 | Swix et al. | |
| 8,898,161 B2 | 11/2014 | Grant et al. | |
| 8,918,331 B2 | 12/2014 | Edwards | |
| 9,165,301 B2 | 10/2015 | Matthys et al. | |
| 2006/0136372 A1 | 6/2006 | Schunemann | |
| 2007/0078714 A1 | 4/2007 | Ott, IV et al. | |
| 2007/0136136 A1 | 6/2007 | Nossik | |
| 2007/0180147 A1 * | 8/2007 | Leigh | G06Q 30/02 709/246 |
| 2009/0245479 A1 * | 10/2009 | Surendran | H04M 3/4878 379/70 |
| 2009/0300594 A1 | 12/2009 | Kozhukh | |
| 2009/0313318 A1 * | 12/2009 | Dye | G06Q 30/00 709/202 |
| 2010/0293014 A1 * | 11/2010 | Jain | G06Q 30/02 705/14.42 |

(Continued)

FOREIGN PATENT DOCUMENTS

KR  10-2008-0105129 A  12/2008

*Primary Examiner* — Yehdega Retta
(74) *Attorney, Agent, or Firm* — Burr & Forman, LLP (57) ABSTRACT

A method for replacing advertising content may include intercepting, at an edge of a network providing communication between an end user device and one or more servers capable of responding to requests from the end user device, a request from the end user device and transmitted via the network, determining whether a response to the request will include advertizing content based on a destination of the request, intercepting the response based on the determination, modifying the response to extract the advertizing content to replace the advertizing content with replacement content in a modified response, and enabling the modified response to be provided to the end user device. The replacement content may be selected based on a comparison of technical properties of the advertizing content with technical properties of the replacement content, and a correlation of affinity criteria associated with the replacement content to a user associated with the end user device.

20 Claims, 4 Drawing Sheets

(56) References Cited

U.S. PATENT DOCUMENTS

| | | |
|---|---|---|
| 2011/0258032 A1 | 10/2011 | Vadlamani et al. |
| 2014/0046778 A1 | 2/2014 | Olson et al. |
| 2014/0129325 A1 | 5/2014 | Zinger et al. |
| 2014/0181634 A1 | 6/2014 | Compain et al. |
| 2015/0302462 A1 | 10/2015 | Chan et al. |

* cited by examiner

METHOD AND APPARATUS FOR ADVERTISING CONTENT MANAGEMENT

TECHNICAL FIELD

Example embodiments generally relate to techniques for managing advertizing content provision and, in particular, relate to apparatuses (and/or methods executable by configured apparatuses) that are configured to facilitate the same.

BACKGROUND

Access service operators including owners of private networks, such as businesses, or those offering public internet access such as airlines, aircraft and airports, as well as shopping malls, coffee shops, hotels, and general access Internet service providers offer Internet access to an audience that is essentially captive. Accordingly, access service operators have the opportunity to provide better targeted advertizing to their audience, or eliminate competing ads by blocking advertizing from competitors from being visible within the operator's computer network. Replacing or removing ads can also reduce network bandwidth usage in some cases, and therefore can lower costs in operating the access service. Thus, access service operators may be expected to have an incentive to employ techniques for providing targeted advertizing to end users, or to eliminate or restrict the advertizing on their networks.

End users may also wish to eliminate advertizing altogether, finding it obtrusive to their use of the Internet. In other cases, end users may prefer to receive advertizing that is better targeted to their personal interests on an opt-in basis. While digital advertizing is theoretically targeted and, in particular the use of re-targeting (i.e., showing an advertisement for something a particular user previously expressed interest in or purchased) is commonplace, in practice targeted advertizing is often clumsy, simplistic and/or unwelcome. Even when targeted advertizing is performed in more elegant ways, such targeted advertizing typically relies upon large amounts of data captured by using tracking cookies to build a picture of individual users before it becomes remotely accurate. Moreover, end users often opt out of such tracking when given the chance.

Accordingly, it may be desirable to generate improved targeted advertising that overcomes some of the issues described above.

BRIEF SUMMARY OF SOME EXAMPLES

Some example embodiments may enable the provision of a system that allows access service operators to intercept and control digital advertizing on their networks. In this regard, for example, some example embodiments may enable access service operators to intercept advertizing content at the edge of their respective networks, as close as possible to the end user. Thus, the identity and interests of the end user may be reliably known since the access service operator may be a known and trusted organization with which the end user has a direct relationship. Moreover, the digital advertizing content may be intercepted at the network edge and replaced with alternative content that is tailored to the end user and is also matched to the content being replaced based on technical properties of the intercepted content.

In one example embodiment, an apparatus provided at an edge of a network providing communication between an end user device and one or more servers capable of responding to requests from the end user device is described. The apparatus may include processing circuitry configured to, when executed intercept a request from the end user device and transmitted via the network, determine whether a response to the request will include advertizing content based on a destination of the request, intercept the response based on the determination, modify the response to extract the advertizing content to replace the advertizing content with replacement content in a modified response, and enable the modified response to be provided to the end user device. The replacement content is selected based on a comparison of technical properties of the advertizing content with technical properties of the replacement content, and a correlation of affinity criteria associated with the replacement content to a user associated with the end user device.

In another example embodiment, a method executable via operation of configured processing circuitry for replacing advertizing content is provided. The method may include intercepting, at an edge of a network providing communication between an end user device and one or more servers capable of responding to requests from the end user device, a request from the end user device and transmitted via the network, determining whether a response to the request will include advertizing content based on a destination of the request, intercepting the response based on the determination, modifying the response to extract the advertizing content to replace the advertizing content with replacement content in a modified response, and enabling the modified response to be provided to the end user device. The replacement content may be selected based on a comparison of technical properties of the advertizing content with technical properties of the replacement content, and a correlation of affinity criteria associated with the replacement content to a user associated with the end user device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some example embodiments may relate to the provision of targeted advertisement replacement executed at the network edge, as close to the end user as possible. The targeted advertisement replacement is therefore capable of being more reliably targeted to the identity and interests of the end user, since the end user has a trusted relationship with the network operator. Moreover, the targeted advertisement replacement is executed on two levels of compatibility. The first level of compatibility may involve the replacement of content best for the user, and the second level of compatibility may involve the replacement of content that best matches the content being replaced.

A challenge associated with achieving a system capable of targeted advertisement replacement of an example embodiment is to enable such system to be built on top of existing advertizing infrastructure to enable migration without replacing existing infrastructure. This requires that existing advertizing related traffic should be identified and then removed, or replaced, with equivalent new content from the perspective of the technical properties of the content. Example embodiments enable targeted advertisement replacement based on definitively knowing the end user and providing interception of advertizing related traffic one hop away from the customer (e.g., at the network edge) with content that is subject to content curation by the access service operator. In some cases, the content curation is performed using content that can be stored in a repository of content provided by partners, approved or whitelisted advertisers, and/or auction winners.

Figure 1:
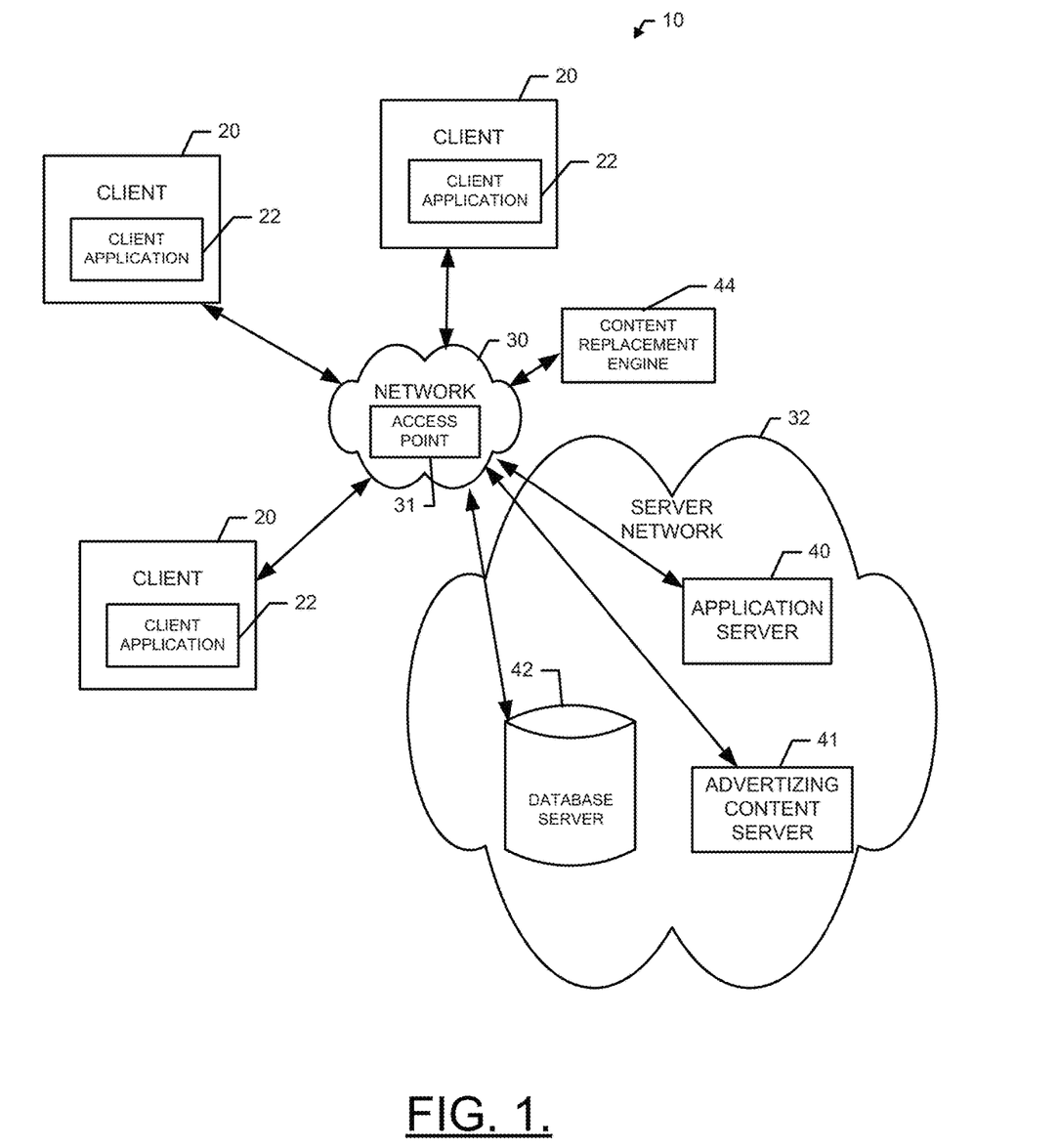
FIG. 1 illustrates a functional block diagram of a system that may be useful in connection with ad content replacement according to an example embodiment.

An example embodiment of the invention will now be described in reference to FIG. 1. As shown in FIG. 1, a system 10 according to an example embodiment may include one or more end user devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced in connection with a single client connected to the system 10.

The clients 20 may, in some cases, each be associated with a single organization, department within an organization, or location (i.e., with each one of the clients 20 being associated with an individual employee or agent of an organization, department or location). However, in some embodiments, each of the clients 20 may be associated with different corresponding individuals, locations, departments or organizations. For example, among the clients 20, one client may be associated with a first individual and one or more of the other clients 20 may be associated with a second individual. In either case, each individual, or the organization may access a wireless communication network 30 to access the Internet or other content that may accessible via the network 30.

Each one of the clients 20 may include or otherwise be embodied as computing device (e.g., a computer, a network access terminal, a personal digital assistant (PDA), cellular phone, smart phone, or the like) capable of communication with or over the network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 may include a client application 22 configured to interact with the network 30 in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for processing instructions to execute a particular application that can be monitored and classified remotely as described in greater detail below.

The client application 22 may be one of a selected group of applications executable at the clients 20, and the client applications on each device may be the same or different. Moreover, the clients 20 may execute the same or different applications simultaneously or at different respective times. Each respective one of various distinct examples of client applications 22 may have distinct communication characteristics associated therewith relative to the communication that occurs via the network 30 to support execution of the corresponding client application 22. As will be seen below, the distinct communication characteristics may be useful for determining whether one of the client applications 22 that is executing on any given one of the clients 20 is receiving advertizing content in accordance with an example embodiment. Thus, in some cases, the client applications 22 may be web browsers or other applications for interacting with content servers via the Internet.

The network 30 may be a wired or wireless communication network such as an air-to-ground (ATG) communication network, a cellular network, or other data network, such as a local area network (LAN), a metropolitan area network (MAN), and/or the like that may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by wireline or wireless communication mechanisms and corresponding communication protocols. In any case, the network 30 may provide the "last hop" between other external networks or components (e.g., of a wide area network (WAN) such as the Internet). Thus, for example, the network 30 may include one or more access points 31 which the clients 20 may connect (e.g., wirelessly) to access the network 30. In such examples, the access points 31 may sometimes be WiFi access points. However, the access points 31 could alternatively be cell towers or other wireless or wireless communication structures, or Ethernet in wired network environments.

In an example embodiment, devices to which the clients 20 may be coupled via the network 30 may include one or more application servers (e.g., an application server 40, an advertizing content server 41, and/or a database server 42, which together may form respective elements of a server network 32. The server network 32 should be appreciated as including servers that can be any combination of collocated or distributed servers and devices located anywhere throughout a WAN such as the Internet. Thus, although the application server 40, the advertising content server 41 and the database server 42 are each referred to as "servers," this does not necessarily imply that they are embodied on separate servers or devices. As such, for example, a single server or device may include some or each of the entities and the advertising content server 41 or database server 42 could merely be represented by a server, database or group of servers/databases physically located on the same server or device as the application server 40.

The application server 40, the advertising content server 41 and the database server 42 may each include hardware and/or software for configuring the application server 40, the advertising content server 41 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide for storage of information or content, or access to services associated with or accessible via execution of the client application 22. The information may also or alternatively include a program or series of executable files and/or instructions that are executable for performing various functions. The application server 40 may host functionality for responding to queries from end users based on execution of the client application 22. For example, where the client application 22 is a web browser, the application server 40 may provide data (e.g., via the database server 42), content or services requested by the client application 22. Moreover, in some cases, the client application 22 may access advertising content from the advertising content server 41 to include along with a response to a request made by the client application 22. The advertising content may be associated with the service, content or function of the application server 40, or may otherwise be targeted advertisement content generated by any suitable method.

In many cases, the advertising content stored at the advertising content server 41 tends to follow particular formats. Moreover, most advertising content accessible via the Internet tends to come from a limited selection of Internet addresses belonging to organizations that manage and syndicate most of the Internet advertising (e.g., Google, DoubleClick, etc.). The advertising operation infrastructure associated with these sources tends to be separated from other consumer facing services, and is therefore relatively easy to identify based on the source address. Existing advertisement blockers tend to identify content having a source address associated with a blacklist of advertising content providers. However, the nature of the content itself is also potentially useful in enabling advertising content to be identified within content served in response to a query for other content or services.

A typical URI will identify the file type (e.g., usually by the file name extension). However, identifying the dimensions associated with specific portions of content being served can also serve as a clue. Although, the dimensions of an image and information indicating whether the image is static or dynamic (e.g., animated) can typically only be determined by deep packet inspection, banner advertisements may have relatively standard sizes. Thus, an image associated with a banner advertisement may be expected to fit into one of a limited number of knowable combinations of width and height. When an image meeting a known combination of width and height that is associated with advertisements is encountered, an inference can be made that the image is likely advertising content.

Many links to advertising content may be generated dynamically by code running both in the browser at page load time and on the advertising platform backend when servicing requests. In such cases, the advertising content may not be finalized until several JavaScript AJAX requests to the advertising content server 41 have been made. Only when a final request for a specific piece of bitmap image or HTML text content is made, can substitution be performed for the content in accordance with example embodiments. IP packet headers typically contain source and destination IP addresses, among other information. The source IP address in the header can be used to identify when an advertising server is being accessed by cross referencing the source IP address with a list of known server addresses. The header is always readable. However, when SSL is used, the payload is encrypted, which can be problematic for deep packet inspection.

Deep packet inspection is computationally more demanding as the packets' payload must be extracted and parsed in order to determine enough information about the content to both identify the content as advertising content and identify enough information about the content to correctly allow it to be replaced. Typically a PNG, JPG or GIF file bitmap image ad will have width and height dimensions encoded in the file header. Therefore, only enough packets (e.g., the first one or two packets) need to be read in a TCP connection to allow the dimensions and file type of the payload to be determined. JPG, in particular, encodes width and height in the third to sixth bytes of the file, so the width and height will almost always be obtainable in the first packet payload. However, an HTTP request may encode large numbers of large cookies and therefore the file itself may start much later in the sequence in some cases.

Ad replacement may also consider not just replacing content, but replacing the destination that they are to click through to, if the ads are interactive/clickable ads. The ads themselves may be just one component of a larger page. However, since the original ads need to record attribution when clicked, the clicking of the ads would involve JavaScript. Example embodiments in which advertising content replacement is performed may consider the factors above to identify replaceable content, select appropriate replacement content and handle/record attribution as appropriate.

In general, the client 20 (or client application 22) may interact with the server network 32 (e.g., the Internet) via the network 30 to send requests to the server network 32 via the network 30. The application server 40 at the server network 32 may generate a response to each of the requests, and the response may include content retrieved from locations including advertising content from the advertising content server 41. These responses would typically be routed back to the client 20 (or client application 22) via the network 30 and served to the end user and may include the advertising content.

As discussed above, because the network 30 is the "last hop" to the client 20, and also generally has a trusted relationship with the client 20, the network 30 edge is an advantageous place from which to monitor requests and responses to such requests to either block or replace advertizing content. In an example embodiment, a content replacement engine 44 may be provided at the network 30 edge to intercept requests and/or responses to perform advertizing content replacement (or blocking) as described herein. In some embodiments, the content replacement engine 44 may be employed to monitor the activity of one or more mobile devices (e.g., the clients 20) to determine whether responses to requests include advertizing content, and to further to determine whether to replace such advertizing content, and which content to use when replacement is to be performed. In this regard, for example, the content replacement engine 44 may include hardware and/or software for enabling the application server 40 to communicate with the clients 20 for the provision and/or receipt of information associated with performing activities as described herein via the network 30 in such a way that the communication can be intercepted and modified as described herein. As such, the environment of FIG. 1 illustrates an example in which provision of content and information associated with the execution of applications at the clients 20 via, for example, wireless communication of any type (e.g., WiFi, 3G, 4G, LTE, ATG networks, etc.) with the network 30 may be monitored and modified by the content replacement engine 44 as described herein.

Figure 2:
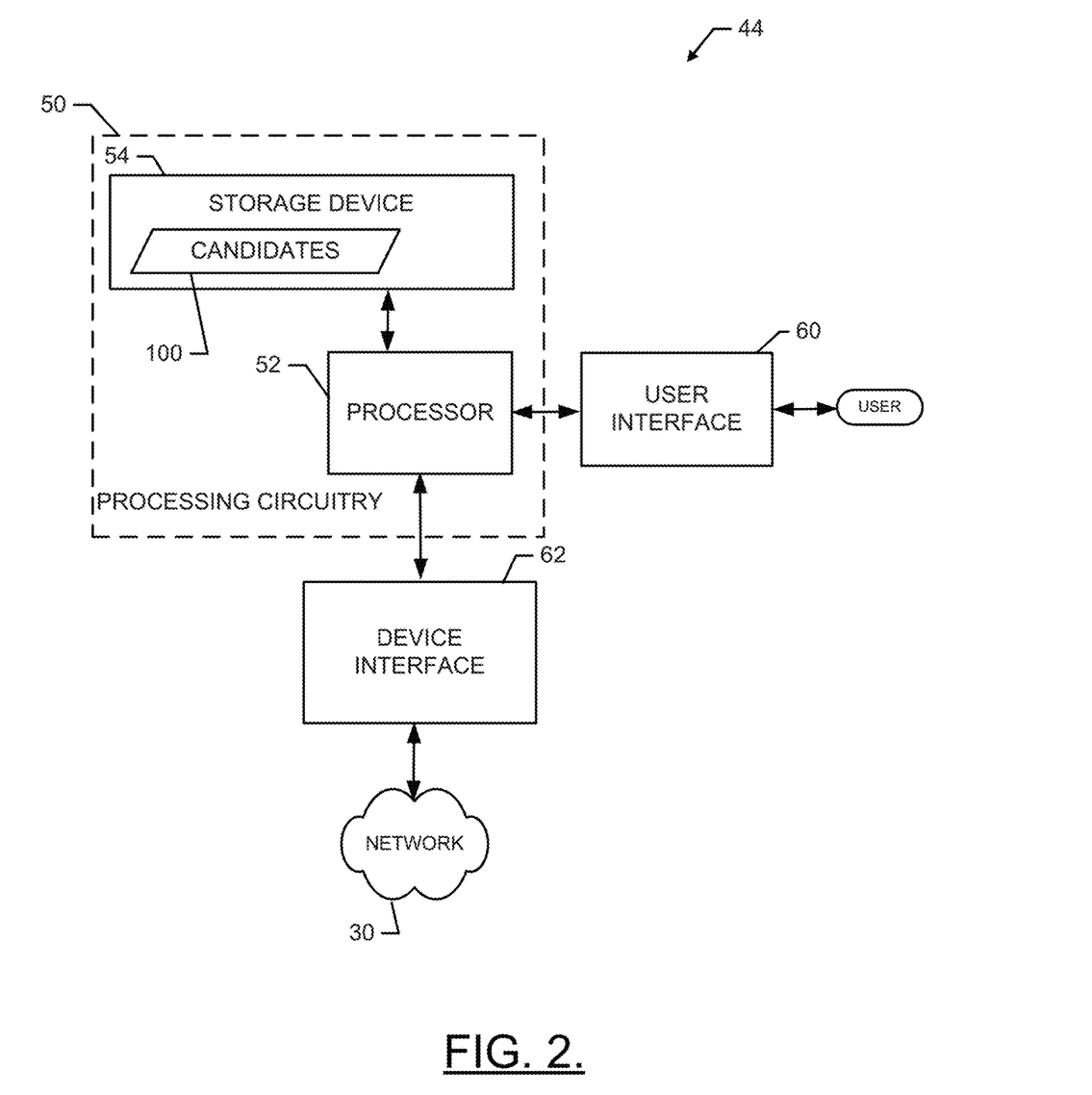
FIG. 2 illustrates a functional block diagram of an apparatus that may be useful in connection with ad content replacement according to an example embodiment.

An example embodiment of the invention will now be described with reference to FIG. 2. FIG. 2 shows certain elements of an apparatus for provision of the targeted advertizing content replacement described herein according to an example embodiment. The apparatus of FIG. 2 may be employed, for example, on a device such as, for example, a network device, server, proxy, or the like at which the content replacement engine 44 may be instantiated. Alternatively, embodiments may be employed on a combination of devices. Accordingly, some embodiments of the present invention may be embodied wholly at a single device or in a distributed environment. Furthermore, it should be noted that the devices or elements described below may not be mandatory and thus some may be omitted in certain embodiments.

Referring now to FIG. 2, an apparatus for provision of targeted advertizing content replacement in accordance with an example embodiment is provided. The apparatus may be an embodiment of the content replacement engine 44 or a device hosting the content replacement engine 44. As such, configuration of the apparatus as described herein may transform the apparatus into the content replacement engine 44. In an example embodiment, the apparatus may include or otherwise be in communication with processing circuitry 50 that is configured to perform data processing, application execution and other processing and management services according to an example embodiment of the present invention. The apparatus may be embodied as a proxy server at the network 30 edge in some cases.

In one embodiment, the processing circuitry 50 may include a storage device 54 and a processor 52 that may be in communication with or otherwise control a user interface 60 (which may be optional) and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 (if employed at all) may be disposed at another device that may be in communication with the processing circuitry 50 via the device interface 62 and/or a network (e.g., network 30).

The user interface 60 (if employed) may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located. In some cases, the user interface 60 may also include a series of menus, web pages or interface consoles generated to guide the user through various options, commands, flow paths and/or the like for control of or interaction with the content replacement engine 44.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases that may store a variety of files, contents or data sets. Among the contents of the storage device 54, applications may be stored for execution by the processor 52 in order to carry out the functionality associated with each respective application. In some cases, contents of the storage device 54 may include replacement advertizing content.

The replacement advertizing content may be organized in such a way as to facilitate replacement of selected advertisement content on a like for like basis. Thus, for example, the replacement content may be stored in such a way that the replacement content is categorized by technical properties and by affinity criteria. The technical properties of the selected advertisement content that is to be replaced can therefore be matched by the technical properties of the replacement advertising content, and the affinity criteria may be used to select the replacement advertising content that is most likely to be effective or well received by the end user based on knowledge of the end user. Thus, the affinity criteria may include scores, rankings or classifications of advertisements by type, genre, price or other distinguishing characteristics. The affinity criteria can be correlated to profile information of the end user (e.g., age, sex, demographic information, shopping patterns, identified interests (e.g., as determined by survey responses), etc.) to determine match scores or likelihood rankings for various items of replacement content. The profile information may be used to identify replacement advertising content to be selected to replace the selected advertisement content based on the match scores or likelihood rankings determined by correlation with the affinity criteria.

As an example, if the end user is a high net worth individual with an affinity for cars, the profile information of the end user may indicate as much by direct or indirect information gathered about the end user. Meanwhile, advertisements accessible to the content replacement engine 44 as potential replacement advertising content may include affinity criteria indicating that a particular advertisement is for a premium car brand based on cost and type (e.g., a car ad). When the content replacement engine 44 identifies that a request made by the end user will be answered by a response including advertising content, the replacement engine 44 may remove the selected advertising content and identify the particular advertisement for the premium car brand as replacement advertising content and modify the response to include the replacement advertising content that is selected based on two-level compatibility as described herein (e.g., user level best fit, and technical level best fit).

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the content replacement engine 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the content replacement engine 44 as described herein.

The content replacement engine 44 may be configured to remotely infer information about the response that is expected to be received for a particular intercepted request. The content replacement engine 44 may also be configured to intelligently identify replacement advertising content that can be selected to be provided in the response instead of the selected advertising content that would otherwise have been provided. In particular, the content replacement engine 44 may be configured to operate at the edge of the network 30 to be able to intercept content at the last stop before it reaches the end user. The content replacement engine 44 can therefore use specific knowledge of the end user to decide which replacement content is best for the end user.

Essentially, the content replacement engine 44 may be configured to recognize when advertising content that is suitable for replacement will come in a response to a user request. The content replacement engine 44 may also be configured to intelligently select replacement content and make the replacement as close to the user as possible, and with as close a technical match as possible so that the modified content is provided without significant delay or error messages. The content replacement engine 44 can therefore essentially operate in real time. To achieve these goals, the content replacement engine 44 may be need to be able to identify replacement advertising content that is the best fit from user level and technical level perspectives.

In an example embodiment, the storage device 54 may store a plurality of approved, selected, or otherwise allowable candidate advertising items (e.g., candidates 100). The candidates 100 may be evaluated against information learned by interrogating each request received from an end user. In this regard, the candidates 100 may each be stored or otherwise organized based on their technical properties (e.g., size, shape, format, media type (e.g., interactive, image sequence, banner, etc.), metadata and/or the like. The candidates 100 may also each have affinity ratings or scores, or otherwise be associated with affinity criteria as described above. When the content replacement engine 44 identifies a response from an end user, and determines that content replacement is possible, the content replacement engine 44 may compare the affinity criteria of each candidate against a profile of the end user and also compare the technical properties of the selected advertising content that is to be replaced to the technical properties of the replacement advertising content to ensure that a match (or near match) can be achieved. The best fit one of the candidates 100 for both affinity and technical property considerations may then be substituted for the selected advertising content.

Of note, in some cases, the candidates 100 may be stored in a single repository (e.g., a single instance of the storage device 54). However, in other cases, the candidates 100 may be in distributed locations (e.g., the storage device 54 embodied in a distributed fashion). In any case, the candidates 100 may be associated with partners or advertisers that are approved or whitelisted. Thus, if other advertising content from a whitelisted address is received, the content replacement engine 44 may actually avoid replacement of such content. Content replacement (or blocking) may therefore be performed on a targeted basis against only specified content. Moreover, the entire process could be implemented only if the user elects content replacement in some cases. The content replacement engine 44 may also be configured to employ location awareness to facilitate selection of content for replacement in some cases. Thus, for example, at the network edge, useful context information may be determined (e.g., via metadata or other sources such as destination, arrival time, current location, etc.) to indicate the location of the user so that applicable advertising content can be served (e.g., relative to commercial context, local geography, local climate and/or the like.

In some cases, the content replacement engine 44 may be further configured to log or otherwise record activities undertaken by the content replacement engine 44 so that, for example, advertising content that is intercepted can be logged in a blockchain for audit purposes. In some examples, information indicative of whether the advertising content was received by the user or a different advertisement sent to the user as replacement content may also be recorded. Similarly, the blocking (e.g., by an adblocker) of advertising content may be recorded such that the blockchain can be used as an audit trail for auditing advertising spend.

Furthermore, in some cases, the content replacement engine 44 may be configured to control the timing of content replacement to facilitate delivery optimization for the network 30 (e.g., by delaying or speeding up delivery). Thus, for example, if the network 30 is a low bandwidth network (which may be known as a characteristic of the network edge), the content replacement engine 44 may be configured to adopt any of various approaches to avoid negative impacts on network operation. In this regard, the content replacement engine 44 may be configured to either pass advertising content after other information is passed in order to not slow down the user from getting the other information, or do the opposite, so the user gets advertising content before getting the other information. QoS rules may be applied (or not) to the delivery of advertising content.

Figure 3:
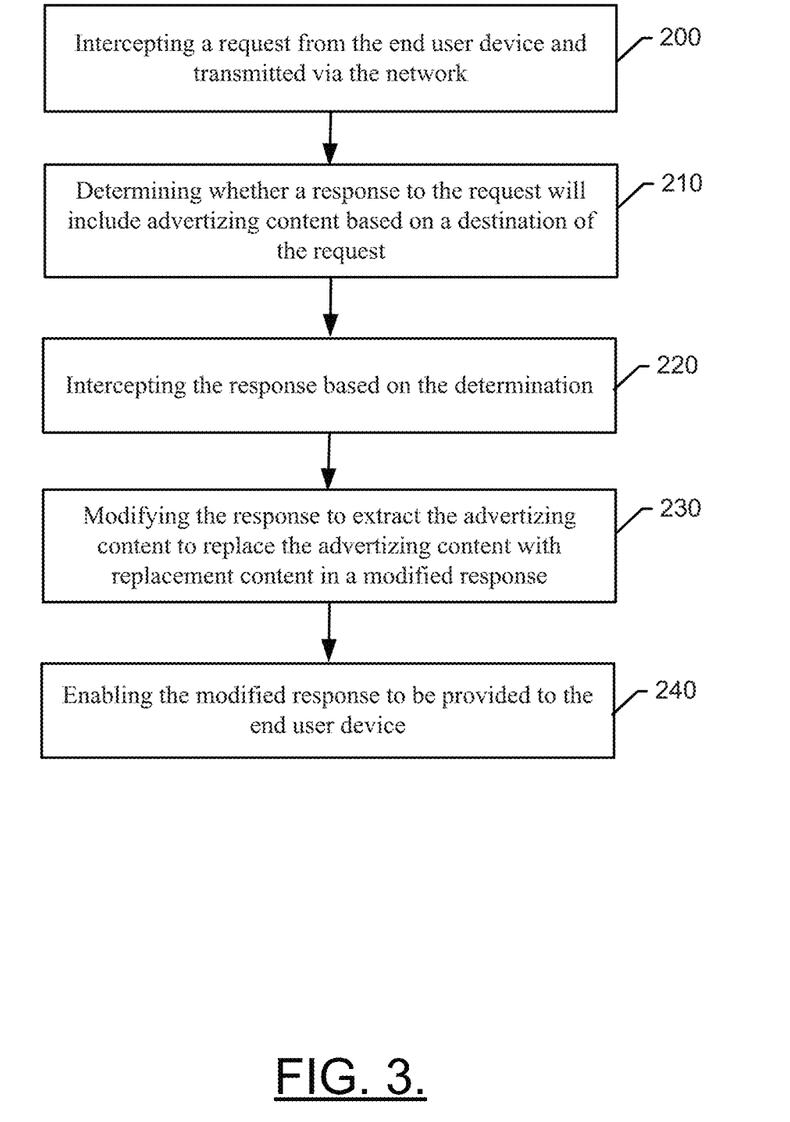
FIG. 3 illustrates a block diagram of a method for ad content replacement in accordance with an example embodiment.

From a technical perspective, the content replacement engine 44 described above may be used to support some or all of the operations described above. As such, the platform described in FIGS. 1-2 may be used to facilitate the implementation of several computer program and/or network communication based interactions. As an example, FIG. 3 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a proxy server (e.g., the content replacement engine 44) and executed by a processor in the proxy server. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method for replacing advertising content according to one embodiment of the invention, as shown in FIG. 3, may include intercepting, at an edge of a network providing communication between an end user device and one or more servers capable of responding to requests from the end user device, a request from the end user device and transmitted via the network at operation 200. The method may further include determining whether a response to the request will include advertising content based on a destination of the request at operation 210. The destination of the request may, for example, be a known or blacklisted ad server (e.g., the advertizing content server 41). Of note, regardless of the determination, the request is passed along unmodified. However, if the destination address is a known or blacklisted ad server, then the response may be awaited for interception. As such, the method may further include intercepting the response based on the determination at operation 220. The method may further include modifying the response to extract the advertising content to replace the advertising content with replacement content in a modified response (e.g., with a substituted or alternative bitmap image or other payload thereby rewriting the packet stream) at operation 230. Of note, only the first two or three packets of the response may typically need to be parsed, since enough information can be gathered to effectively enable modification (or substitution). Subsequent packets can be ignored, and thus any delay associated with the modification may be relatively small. The method may further include enabling the modified response to be provided to the end user device at operation 240. The replacement content may be selected based on a comparison of technical properties of the advertizing content with technical properties of the replacement content, and a correlation of affinity criteria associated with the replacement content to a user associated with the end user device.

In an example embodiment, an apparatus for performing the method of FIG. 3 above may comprise a processor (e.g., the processor 52) or processing circuitry configured to perform some or each of the operations (200-240) described above. The processor may, for example, be configured to perform the operations (200-240) by performing hardware implemented logical functions, executing stored instructions, or executing algorithms for performing each of the operations.

In some embodiments, the processor or processing circuitry may be further configured for additional operations or optional modifications to operations 200-240. The additional operations or optional modifications may each be performed individually or in any combination with each other. In this regard, for example, the comparison of the technical properties of the advertizing content with the technical properties of the replacement content may include determining a match between the technical properties of the advertizing content with the technical properties of the replacement content. In some cases, the technical properties of the advertizing content may include properties indicative of size and shape of the advertising content or a format and type of the advertising content. In an example embodiment, the affinity criteria includes a classification of the replacement content by type, genre or price. In some cases, the correlation of the affinity criteria to the user includes selecting the replacement content based on comparing the type, genre or price of potential replacement content to profile information associated with the user. In an example embodiment, the replacement content is stored in a repository associated with a proxy server at the edge of the network. In some cases, the replacement content is auctioned content. In an example embodiment, determining whether the response to the request will include advertising content may include determining whether the destination of the request is an advertising content server. In some cases, intercepting the request may be performed in response to a prior election of the user to enable content replacement at the end user device. In other words, the user may manually set a browser (e.g., client application 22) at the end user device (e.g., client 20) to use HTTP proxies and enable operation of the content replacement engine 44. However, in other cases, when the network 30 is a private network, the network 30 can force the use of the proxy and thereby force the requests from the end user to be evaluated by the content replacement engine 44. In other examples, web cache communication protocol (WCCP) may be employed to ensure that browsers on private networks automatically configure to use the content replacement engine 44.

Figure 4:
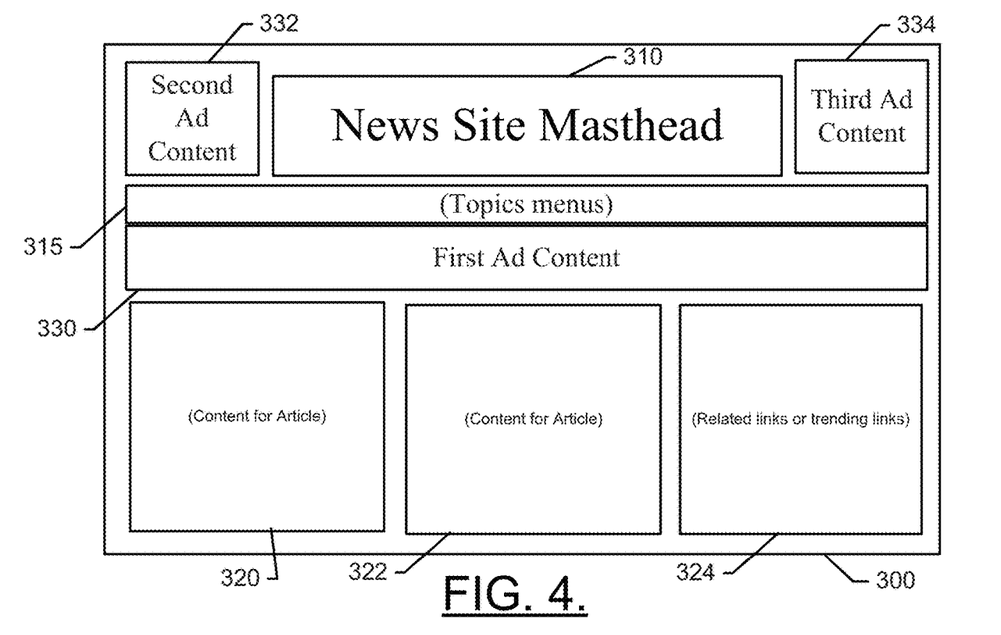
FIG. 4 illustrates a response page served without ad content replacement according to an example embodiment.

An example embodiment will be described in operation in reference to FIGS. 4 and 5. FIG. 4 illustrates a response 300 to a request for the main or home page of a news site. However, it should be appreciated that the response page 300 could alternatively be any of a number of other types of web sites, services, or content platforms. The response page 300 may include the news site masthead 310 prominently positioned with a menu bar 315 positioned underneath to provide a list of topics or menus that are selectable by the user. Content for a first article 320, a second article 322, and perhaps several related or trending links 324 may also be provided on the response page 300. In addition, one or more instances of advertising content may also appear at any of various locations on the response page 300. In this regard, for example, a banner may be provided under the news site masthead 310 as first ad content 330. Other smaller banners or animated content sequences may also be provided at other locations as second ad content 332 and third ad content 334. The ad content may be selectable by the user to link to services, content, offers and/or the like associated with various vendors that have bid or otherwise paid for the ad content to be displayed. The ad revenue may be shared as defined by agreement amongst parties involved in service of the ads such as, for example, the publisher, the network, an agency, and the advertiser.

In reference to FIGS. 1-3, a request for service of the response page 300 may be initially provided from an end user device (e.g., one of the clients 20). The request may be intercepted at the content replacement engine 44 to determine whether a response to the request will include advertising content based on a destination of the request. This determination may be performed via any of a number of ways. In some cases, the content replacement engine 44 may be configured to see if the request is being sent to a source address associated with advertizing (e.g., the advertizing content server 41). If a source address associated with advertizing is detected, then the content replacement engine 44 may intercept the response when the response reaches the network 30 and just before service to the end user. In an example embodiment, the response page 300 of FIG. 4 would normally be served to the end user without operation of the content replacement engine 44. However, when the content replacement engine 44 intercepts the response, the files associated with the response page 300 can be inspected to identify advertizing content.

As mentioned above, the dimensions associated with specific portions of content being served can serve as a clue to where advertising content is located. In FIG. 4, the size and shape of the first ad content 330 may be a standard size, and the size and shape of the second ad content 332 and the third ad content 334 may also be a different standard size. The type of content (e.g., static image, dynamic image, series of images, etc.) may also be determined. The candidates 100 may then be compared to the technical properties of each of the first, second and third ad contents 330, 332 and 334 to identify selected ones of the candidates that match (or nearly match). Affinity criteria associated with the selected ones of the candidates may simultaneously, subsequently or previously also be compared to information about the end user (e.g., via a user profile) to allow replacement content to be identified for each respective one of the first, second and third ad contents 330, 332 and 334. The response page 300 will then be modified to include the replacement content and will be served to the end user as a modified response page 400, shown in FIG. 5.

Figure 5:
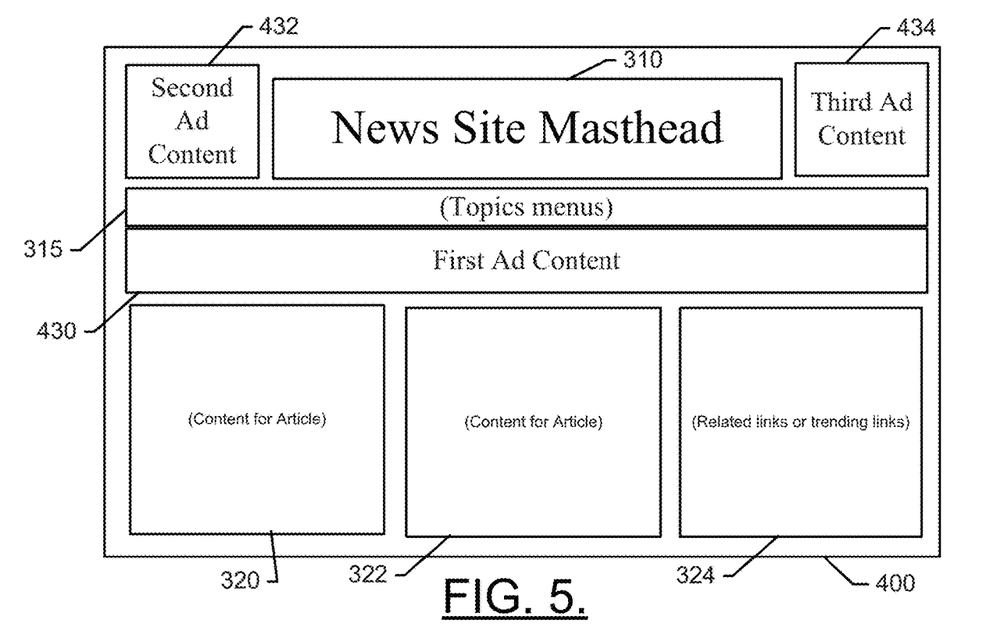
FIG. 5 illustrates a modified response page according to an example embodiment.

As shown in FIG. 5, the modified response page 400 may be substantially identical to the response page 300 except that the first ad content 330 is replaced by first replacement content 430, the second ad content 332 is replaced by second replacement content 432, and the third ad content 334 is replaced by third replacement content 434. As mentioned above, the replacement is performed based on a two-level best fit determination. The two levels include a technical property best fit, and an affinity criteria best fit. Thereafter, the modified response page 400 is served to the end user device (e.g., the client 20).

Example embodiments may allow for better and more targeted advertisement. Moreover, since the content passing through the network edges can be scrubbed of irrelevant ad content and such content can be replaced by more relevant content, the user experience and revenue generation can both be improved. Content can truly be targeted to the needs and profile of the end user, based on the end user details known as part of their customer record, and based on knowing the complete set of Internet domains the end user connects to instead of purely guessing or using keyword matching against page contents.

Revenue from ads can be shared between network edge points (e.g., ISPs or private network operators) and the content providers based on the proportions of ads served and/or clicked. The ad contents can be managed by the edge networks on behalf of their agents, and therefore the content can always be relevant to the country or market that the end user is located in. This avoids wastage associated with having users in one location browse content associated with another location and seeing ads for products or services that are not even available in their own location.

Example embodiments may serve as an ad blocker (if replacement is not performed), but may also act as a more effective ad blocker than typical whitelist/blacklist-based ad blocker technologies. Knowing the identity of the end users receiving advertising content can make it much harder for those individuals to be faked because unusually high traffic patterns will clearly stand out. Furthermore, JavaScript code embedded in placeholders can also be used to monitor mouse cursor input to when the target device is a desktop computer (e.g., not a mobile device or tablet) to look for irregular mouse cursor movements that would indicate a human user.

Example embodiments may therefore allow placeholders to be provided in content alongside existing advertising network systems to allow a migration between the two systems. The users of the edge network can be identified as being compatible with the new technology by having their HTTP requests augmented with HTTP headers identifying their compatibility with the edge network advertising system. The edge network advertising system can therefore curate the ad content that is ultimately provided to its users.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus provided at an edge of a network providing communication between an end user device and one or more servers capable of responding to requests from the end user device, the apparatus comprising processing circuitry configured to, when executed:
    intercept a request from the end user device and transmitted via the network;
    determine whether a response to the request will include advertising content based on a destination of the request;
    intercept the response based on the determination;
    modify the response to extract the advertising content to replace the advertising content with replacement content in a modified response; and
    enable the modified response to be provided to the end user device,
    wherein the replacement content is selected based on:
        a comparison of technical properties of the advertising content with technical properties of the replacement content, and
        a correlation of affinity criteria associated with the replacement content to a user associated with the end user device.

2. The apparatus of claim 1, wherein the comparison of the technical properties of the advertising content with the technical properties of the replacement content comprises determining a match between the technical properties of the advertising content with the technical properties of the replacement content.

3. The apparatus of claim 2, wherein the technical properties of the advertising content comprise properties indicative of size and shape of the advertising content.

4. The apparatus of claim 2, wherein the technical properties of the advertising content comprise properties indicative of a format and type of the advertising content.

5. The apparatus of claim 1, wherein the affinity criteria comprises a classification of the replacement content by type, genre or price.

6. The apparatus of claim 5, wherein the correlation of the affinity criteria to the user comprises selecting the replacement content based on comparing the type, genre or price of potential replacement content to profile information associated with the user.

7. The apparatus of claim 1, wherein the replacement content is stored in a repository associated with a proxy server at the edge of the network.

8. The apparatus of claim 1, wherein the replacement content is auctioned content stored in a repository associated with a proxy server at the edge of the network.

9. The apparatus of claim 1, wherein determining whether the response to the request will include advertising content comprises determining whether the destination of the request is an advertising content server.

10. The apparatus of claim 1, wherein intercepting the request is performed in response to a prior election of the user to enable content replacement at the end user device.

11. A method executable via operation of configured processing circuitry, the method comprising:
    intercepting, at an edge of a network providing communication between an end user device and one or more servers capable of responding to requests from the end user device, a request from the end user device and transmitted via the network;
    determining whether a response to the request will include advertising content based on a destination of the request;
    intercepting the response based on the determination;
    modifying the response to extract the advertising content to replace the advertising content with replacement content in a modified response; and
    enabling the modified response to be provided to the end user device,
    wherein the replacement content is selected based on:
        a comparison of technical properties of the advertising content with technical properties of the replacement content, and
        a correlation of affinity criteria associated with the replacement content to a user associated with the end user device.

12. The method of claim 11, wherein the comparison of the technical properties of the advertising content with the technical properties of the replacement content comprises determining a match between the technical properties of the advertising content with the technical properties of the replacement content.

13. The method of claim 12, wherein the technical properties of the advertising content comprise properties indicative of size and shape of the advertising content.

14. The method of claim 12, wherein the technical properties of the advertizing content comprise properties indicative of a format and type of the advertizing content.

15. The method of claim 11, wherein the affinity criteria comprises a classification of the replacement content by type, genre or price.

16. The method of claim 15, wherein the correlation of the affinity criteria to the user comprises selecting the replacement content based on comparing the type, genre or price of potential replacement content to profile information associated with the user.

17. The method of claim 11, wherein the replacement content is stored in a repository associated with a proxy server at the edge of the network.

18. The method of claim 11, wherein the replacement content is auctioned content stored in a repository associated with a proxy server at the edge of the network.

19. The method of claim 11, wherein determining whether the response to the request will include advertizing content comprises determining whether the destination of the request is an advertizing content server.

20. The method of claim 11, wherein intercepting the request is performed in response to a prior election of the user to enable content replacement at the end user device.

* * * * *